United States Patent
Geisthoff et al.

[15] 3,703,089
[45] Nov. 21, 1972

[54] DETACHABLE COUPLING DEVICE FOR TORQUE TRANSMITTING SHAFTS

[72] Inventors: Hubert Geisthoff, Rheinl; Hans-Heinrich Welschof, Obertshausen; Hubert Grosse-Entrup, Rheinl, all of Germany

[73] Assignee: Firma Jean Walterscheid K.G., Lohmar, Germany

[22] Filed: July 12, 1971

[21] Appl. No.: 161,501

[30] Foreign Application Priority Data

July 18, 1970 Germany..........P 20 35 788.4

[52] U.S. Cl. ..................................64/32 R, 64/17 R
[51] Int. Cl.............................................F16d 3/32
[58] Field of Search...............................64/17, 32, 6

[56] References Cited

FOREIGN PATENTS OR APPLICATIONS 1,560,109 2/1969 France..........................64/17

*Primary Examiner*—Edward G. Favors
*Attorney*—Edmund M. Jaskiewicz

[57] ABSTRACT

A coupling device comprises a conical coupling element on one shaft which is inserted into a tapered opening in the end of a yoke element extending from a universal joint connected to another shaft. The outer surface of the conical element has an annular groove in which are positioned two semi-circular blocking members pivotally mounted on the open end of the yoke element and having bent ends extending outwardly through openings in the yoke element. Spring means urge the blocking members inwardly into the groove to retain the coupling elements in driving relationship. A protective housing surrounding the conical coupling element has a lever pivotally mounted thereon which is operatively connected to a cylindrical slide element having an inner conical surface engageable with the projecting ends of the blocking members to release the blocking members from locking engagement with the conical coupling element.

7 Claims, 3 Drawing Figures

INVENTORS
HUBERT GEISTHOFF
HANS-HEINRICH WELSCHOF
HUBERT GROSSE-ENTRUP

Edmund M. Jaskiewicz
ATTORNEY

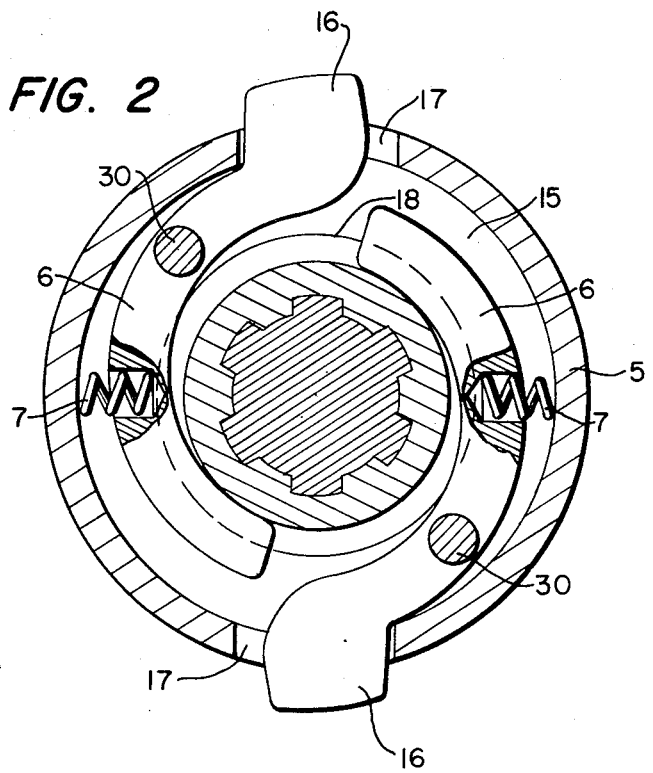

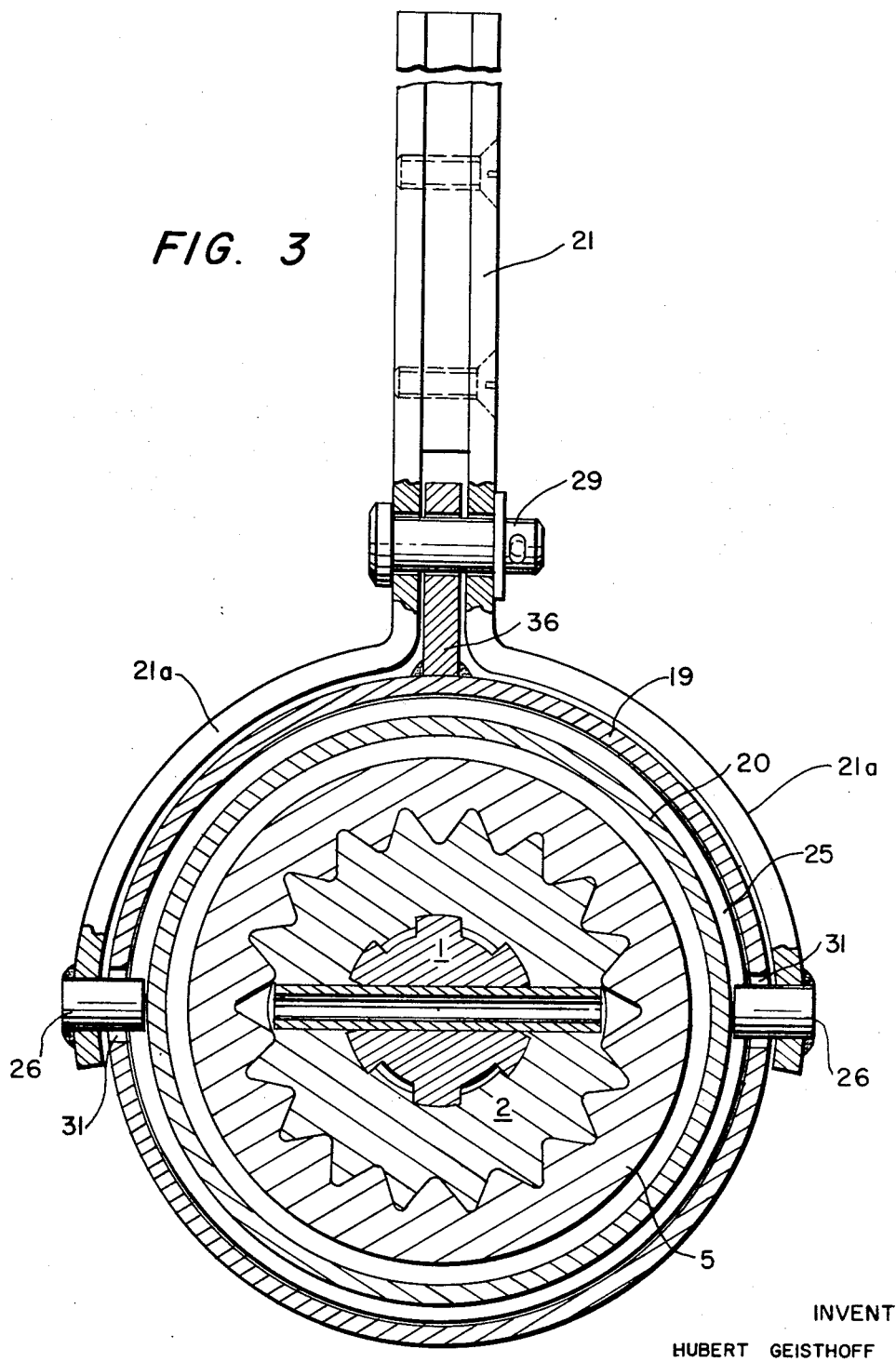

DETACHABLE COUPLING DEVICE FOR TORQUE TRANSMITTING SHAFTS

The present invention relates to coupling devices for torque transmitting shafts, more particularly, to a detachable coupling device for the coaxial connection of torque transmitting shafts such as on agricultural machines.

Tractors and other prime movers such as employed in agricultural operations are generally provided with power takeoff shafts which can be connected to driven shafts in agricultural implements which are attached to the tractors for the purpose of driving the implements. A wide variety of coupling devices have been proposed for coupling such power takeoff shafts to driven shafts of the agricultural machines. It is preferable to connect such driving and driven shafts in coaxial end-to-end relationship since such a connection occupies a minimum of space. However, previous coupling devices proposed for such a coaxial connection have been generally unsatisfactory since they have been cumbersome in structure and cannot be readily operated by the operator of the tractor without exposing him to possible injury. While some of these coupling devices have been effective in operation they have been complicated in structure and hence required almost constant servicing to enable them to operate. Since coupling devices, particularly in agricultural machines, are subjected to rough and continuous usage it is apparent that satisfactory coupling devices must be simple in operation yet rugged in structure.

It is therefore the principle object of the present invention to provide a novel and improved detachable coupling device for the coaxial connection of torque transmitting shafts.

It is another object of the present invention to provide a detachable coupling coupling device for the coaxial connection of torque transmitting shafts such as for agricultural machines which is simple in structure, reliable and safe in operation, and requires a minimum of maintenance.

The objects of the present invention are attained and the disadvantages of the prior art are eliminated by the coupling device disclosed as the present invention. The present invention discloses a detachable coupling device for the coaxial connection of torque transmitting shafts which essentially comprises a conical first coupling element mounted on one shaft and having an external annular groove thereon. A second coupling element has a tapered open end and is formed in a yoke member of a universal joint whose other yoke member is mounted on another shaft. The open coupling element is adapted to receive the conical coupling element in driving relationship. Lateral openings are provided in the open ended coupling element. A pair of blocking members are pivotally mounted within the open ended coupling element and have outwardly bent ends projecting through the lateral openings. Spring means are provided to urge the blocking members into locking engagement with the groove on the conical coupling element when both coupling elements are in driving relationship. A cup-shaped protective housing is mounted concentrically with respect to the one shaft and extends outwardly of its end. A cylindrical element is slidably mounted within the protective housing and is operatively connected to a lever pivotally mounted to the exterior of the housing. An internal tapered surface is provided in the end of the cylindrical element facing toward the end of the shaft with this surface being engageable with the outwardly projecting ends of the blocking members to disengage them from the grooves in the conical coupling element.

Other objects and advantages of the present invention will be apparent upon reference to the accompanying description when taken in conjunction with the following drawings, which are exemplary, wherein:

FIG. 2 is a sectional view taken along the line II—II of FIG. 1; and

FIG. 3 is a sectional view taken along the line III—III of FIG. 1.

Proceeding next to the drawings wherein like reference symbols indicate the same parts throughout the various views a specific embodiment of the present invention will be described in detail.

Figure 1:
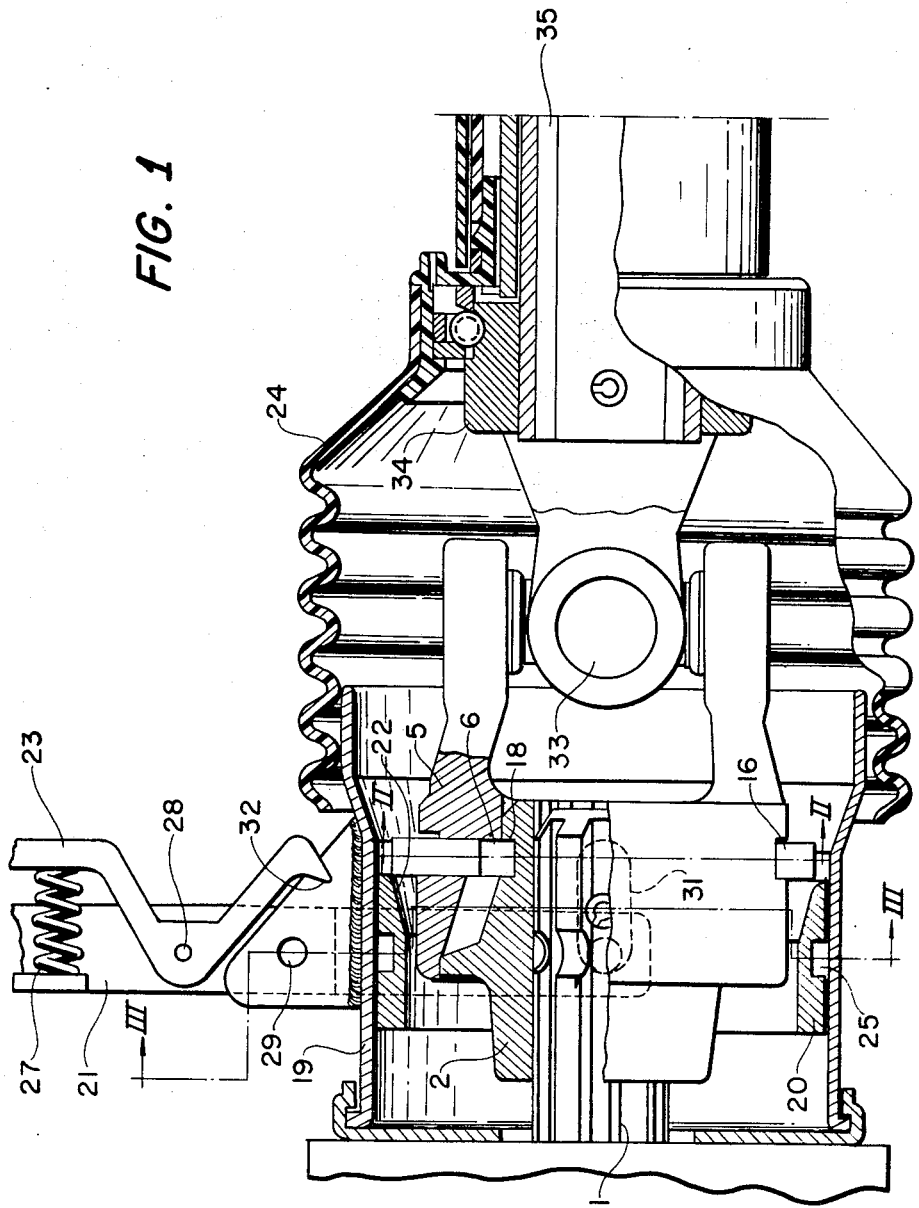
FIG. 1 is a longitudinal sectional view of the detachable coupling device according to the present invention.

As may be seen in FIG. 1, a driving shaft 1, such as a power takeoff shaft from a tractor or other machine, has a conical coupling element 2 mounted thereon and secured against rotation and axial displacement. The coupling element 2 is provided with axially extending teeth, as may be seen in FIG. 3, which drivingly engage with corresponding formed teeth in the open tapered end of a coupling element 5 formed in a yoke member of a universal joint 33. The meshing teeth are so shaped that when the coupling elements are coupled in driving relationship the torque is transmitted to surfaces arranged in parallel with the central longitudinal axis. The outer portions of the teeth wherein the initial engagement occurs are substantially pointed as will be apparent in FIG. 3.

The universal joint 33 comprises a second yoke element 34 which is secured in a normal manner on a driven shaft 35 which may extend from an agricultural machine which is to be powered.

A pair of semi-circular blocking members 6 are pivotally mounted by respective pivot pins 30 within an internal annular groove 15 formed within the coupling element 5. The blocking members have bent outer ends 16 which extend outwardly through lateral openings 17 formed in the coupling element 5. Compression spring 7 are positioned between the inner wall of the coupling element 5 and the blocking members 6 to urge the blocking members into locking relationship with an external annular groove 18 formed in the outer surface of the coupling element 2.

The construction of the blocking members whereby their outwardly bent ends extend exteriorly of the coupling element 5 facilitates the uncoupling operation of the disclosed coupling device since only the ends of the blocking members are visible from the exterior of the coupling device or, under poor lighting conditions such as darkness, can be detected by touch. Merely exerting a radial pressure on these outwardly projecting ends disengages the blocking members from the conical coupling element 2. The location of the blocking member springs within the interior of the open ended coupling element 5 projects the springs against dirt, damage or other external influences.

A cup-shaped protective housing 19 is rotatably mounted on the machine so as to be concentric with the shaft 1 and extends outwardly beyond the end of this shaft. A lever 21 is pivotally mounted on a pin 29 positioned in a bracket 36 mounted on the outer face of the protective housing 19. The lever 21 is provided with bifurcated end portions 21a which straddle the housing 19 as may be seen in FIG. 3. Inwardly directed pins 26 are attached to the ends of the bifurcated portions 21a and pass through longitudinal slots 31 formed in the housing 19. The pins 26 are received in an external annular groove 25 formed in the outer surface of a cylindrical element 20 slideably mounted within the housing 19 so as to be axially displaceable therein. The end of the slide element directed toward the open end of the housing 19 is provided with an internal tapering or conical surface 22.

The construction of the operating lever whereby one end of the lever is bifurcated and straddles the protective housing enables the coupling device to be simply and compactly constructed and provides for safe operation of the coupling device.

With this construction it can be seen that when the lever 21 is pivoted in a counter-clockwise direction as seen in FIG. 1, the slide element 20 will move to the right and its conical surface 22 will engage the outwardly projecting ends 16 of the blocking members 6 when the coupling device is in the locked or engaged position as shown in FIG. 1.

A lock bolt 23 is pivotally mounted at 28 on the lever 21 and has one end thereof urged into locking engagement with a notch or recess 32 by a spring 27.

The second cup-shaped protective housing 24 which may be of a flexible material as known in the art is rotatably mounted on the universal joint yoke member 34 or may be mounted on the shaft 35 itself. The open end of the cup-shaped protective housing 24 covers the universal joint 33 and overlaps the end of the protective housing 19 when the coupling device is in its locked position. This overlapping relationship of the protective elements protects against accidental contacts with the universal joint even when the universal joint bends over a wide range of angles.

The open ended coupling element 5 extends outwardly of the protective housing 24 to such an extent that the coupling element 5 can be introduced securely into the protective housing 19 for the purpose of coupling to the coupling element 1.

In the operation of the above described coupling device, when the coupling device is in its locked position as shown in FIG. 1 the lock bolt 23 is pressed against the spring 27 to disengage the bolt from the recess 32. The lever 21 is then pivoted in the counter-clockwise direction whereby the cylindrical slide element 20 is moved axially toward the right to enable its conical surface 22 to engage the outer ends 16 of the blocking members 6. The blocking members 6 are pivoted radially outwardly as viewed in FIG. 2 against the force of the springs 7 so that the blocking members are disengaged from the groove 18 on the conical coupling element 2. The universal joint shaft 35 can then be withdrawn from the protective housing 19.

In order to connect the universal joint shaft 35 to the shaft 1, the open ended coupling element 5 is introduced into the protective housing 19 until the coupling elements 2 and 5 are locked to each other by the spring loaded blocking members 6. The lever 21 will be in the position illustrated in FIG. 1 with the lock bolt 23 in its locking position in the notch 32. The coupling element 5 can be accurately introduced into the protective housing 19 since the coupling element 5 extends outwardly beyond its protective housing 24.

The mounting of the operating lever on a rotatable protective housing enables the operator of the tractor to actuate the lever without leaving his seat when the tractor is to be uncoupled from an agricultural machine attached to it. The rotatable mounting of the operating lever also enables the operator to uncouple the shafts when he is standing next to the machines since it is not necessary that the operator enter the space between the machines in order to disconnect the driving and driven shafts. The lock bolt on the protective housing prevents unintentional or accidental pivoting of the operating lever and thus avoids undesired uncoupling of the shaft 35.

The overlapping relationship of the protective housings on the respective shafts enables the two coupling elements to be connected with each other in a safe and reliable manner. Further, the overlapping relationship of the protecting elements provides full protection against accidental contact with the rotating portions of the universal joint shaft as the shaft bends through different operating angles.

Thus it can be seen that the present invention has disclosed a detachable coupling device which is simple in construction and provides for safe and reliable coaxial connection of torque transmitting shafts such as commonly employed with agricultural machinery.

It is understood that this invention is susceptible to modification in order to adapt it to different usages and conditions and, accordingly, it is desired to comprehend such modifications within the invention as may fall within the scope of the appended claims.

What is claimed is:

1. In a detachable coupling device for the coaxial connection of torque transmitting shafts, the combination of a first shaft, a conical first coupling element having an external annular groove therein mounted on said first shaft, a second shaft having a second coupling element mounted on the end thereof, said second coupling element having an open end with a conical opening therein for receiving said first conical coupling element in driving relationship, there being openings in said second coupling element, blocking means pivotally mounted within said second coupling element, said blocking means having bent ends projecting through said openings, and spring means urging said blocking means into locking engagement with said first coupling element groove when said coupling elements are in driving relationship.

2. In a detachable coupling device as claimed in claim 1 wherein said second shaft has a first yoke member of a universal joint mounted on the end thereof and a second yoke member of said universal joint defining said second coupling element.

3. In a detachable coupling device as claimed in claim 2 and comprising a cup-shaped housing mounted concentrically to said first shaft and extending beyond the end thereof, a cylindrical element slideably mounted within said housing for axial displacement therein and having an internal conical surface on the end thereof directed toward the open end of the housing, and a lever pivotally mounted on said housing and operatively connected to said slideable cylindrical element so that axial displacement of said slideable element will cause the conical surface therein to engage the bent ends of said blocking means to pivot the blocking means out of engagement from said first coupling element groove.

4. In a detachable coupling device as claimed in claim 3 wherein one end of said lever is bifurcated with the bifurcated portions straddling said housing, inwardly directed pins on the ends of the bifurcated portions, there being longitudinal slots in the housing with said pins passing therethrough, said cylindrical slide element having an annular groove therein receiving the ends of said pins.

5. In a detachable coupling device as claimed in claim 4 wherein said housing is rotatably mounted around said first shaft, and spring-loaded locking bolt means engageable with said lever for locking said lever in position.

6. In a detachable coupling device as claimed in claim 5 and comprising a second cup-shaped housing rotatably mounted on said second shaft and extending over said universal joint to overlap said first housing when the shafts are coupled.

7. In a detachable coupling device as claimed in claim 6 wherein the open end of said second yoke member extends beyond said second housing.

* * * * *